(12) United States Patent  
Huang et al.

(10) Patent No.: US 9,258,726 B2  
(45) Date of Patent: Feb. 9, 2016

(54) METHODS AND APPARATUS FOR SPECTRAL SCANNING WITHIN A NETWORK

(75) Inventors: Liang-Jong Huang, Pleasanton, CA (US); Lap Kong Law, Dublin, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 362 days.

(21) Appl. No.: 13/435,500

(22) Filed: Mar. 30, 2012

(65) Prior Publication Data

US 2013/0258859 A1 Oct. 3, 2013

(51) Int. Cl.  
*H04W 24/10* (2009.01)  
*H04W 16/10* (2009.01)

(52) U.S. Cl.  
CPC ............. *H04W 24/10* (2013.01); *H04W 16/10* (2013.01)

(58) Field of Classification Search  
CPC . H04W 16/14; H04W 56/00; H04W 72/0406; H04W 72/082; H04W 72/085; H04W 72/1231; H04W 84/12; H04W 88/06; H04W 88/16; H04W 16/06; H04W 24/00; H04W 24/04; H04W 24/08; H04W 36/00; H04W 36/0083; H04W 24/10; H04W 16/10  
USPC ......................................................... 370/328  
See application file for complete search history.

(56) References Cited

U.S. PATENT DOCUMENTS

| | | | |
|---|---|---|---|
| 2010/0173586 A1* | 7/2010 | McHenry et al. | 455/62 |
| 2010/0177673 A1* | 7/2010 | Yoon | 370/311 |
| 2010/0197243 A1* | 8/2010 | Chu et al. | 455/77 |
| 2010/0246544 A1* | 9/2010 | Brisebois et al. | 370/338 |
| 2010/0316155 A1* | 12/2010 | Reinhold | 375/267 |
| 2012/0063364 A1* | 3/2012 | Emmelmann et al. | 370/255 |

FOREIGN PATENT DOCUMENTS

CN 1860806 A 11/2006

OTHER PUBLICATIONS

Aruba Networks; ArubaOS Operating System Software; Aruba Data Sheet; www.arubanetworks.com/pdf/products/DS_AOS.pdf; retrieved Feb. 3, 2012; 8 pages.

Aruba Networks; Adaptive Radio Management; 2011; www.arubanetworks.com/products/arubaos/adaptive-radio-management; retrieved Feb. 3, 2012; 2 pages.

(Continued)

*Primary Examiner* — Andrew Lai  
*Assistant Examiner* — M Mostazir Rahman  
(74) *Attorney, Agent, or Firm* — Cooley LLP

(57) ABSTRACT

In some embodiments, an apparatus includes a spectral scanning controller configured to interrupt service at a wireless access point (WAP) such that the WAP performs spectral scanning during service interruption. The spectral scanning controller is configured to interrupt service at the WAP at a first scanning frequency when the spectral scanning controller is in a first configuration. The spectral scanning controller is configured to interrupt service at the WAP at a second scanning frequency different from the first scanning frequency when the spectral scanning controller is in a second configuration. The spectral scanning controller is configured to move from the first configuration to the second configuration in response to a change in at least one of a service demand, a service quality, a spectral scanning demand or a spectral scanning quality.

15 Claims, 3 Drawing Sheets

(56) References Cited

OTHER PUBLICATIONS

Cisco; Cisco CleanAir Technology: intelligence in Action; 2010; pp. 1-9.

Office Action for Chinese Patent Application No. 201310116578.9 dated Jul. 1, 2015.
Search Report for Chinese Patent Application No. 201310116578.9 dated Jun. 23, 2015.

* cited by examiner

METHODS AND APPARATUS FOR SPECTRAL SCANNING WITHIN A NETWORK

BACKGROUND

Some embodiments described herein relate generally to radio spectral scanning, and, in particular, to methods and apparatus for performing intelligent spectral scanning of wireless access points.

Some known spectral scanning schemes can be operated at wireless access points to gather useful spectral information, which can be used to classify interferences in the vicinity of the radio of the wireless access points. Such a spectral scanning scheme is typically operated with a set of fixed parameters including a fixed scanning frequency. Operations of this spectral scanning scheme, however, can significantly degrade performance of the wireless service if the scanning frequency is too high. In general, the higher the spectral scanning frequency, the worse the performance of the wireless service. On the other hand, if the scanning frequency is too low, the scanning resolution may not be high enough for the classifier to identify interferences accurately. As a result, the classifier either misclassifies or cannot classify the interference at all.

Some known access points can implement a configurable but fixed spectral scanning scheme, which offers a spectral-first or a data-first configuration option to allocate the radio resource between spectral scanning and wireless service. Such a spectral scanning scheme, however, can easily generate unpredictable or unacceptable results because the configuration selection is binary and it basically favors either spectral scanning or wireless service when the corresponding configuration option is selected and spectral scanning and wireless service are competing for the radio resource. Thus, the non-selected option will not be fully utilized and will be compromised.

Accordingly, a need exists for intelligent spectral scanning methods and apparatus that can meet different operation goals under different circumstances. Particularly, a need exists for intelligent spectral scanning methods and apparatus that satisfy the spectral scanning requirement while maintaining the quality of the wireless service.

SUMMARY

In some embodiments, an apparatus includes a spectral scanning controller configured to interrupt service at a wireless access point (WAP) such that the WAP performs spectral scanning during service interruption. The spectral scanning controller is configured to interrupt service at the WAP at a first scanning frequency when the spectral scanning controller is in a first configuration. The spectral scanning controller is configured to interrupt service at the WAP at a second scanning frequency different from the first scanning frequency when the spectral scanning controller is in a second configuration. The spectral scanning controller is configured to move from the first configuration to the second configuration in response to a change in at least one of a service demand, a service quality, a spectral scanning demand or a spectral scanning quality.

DETAILED DESCRIPTION

Figure 1:
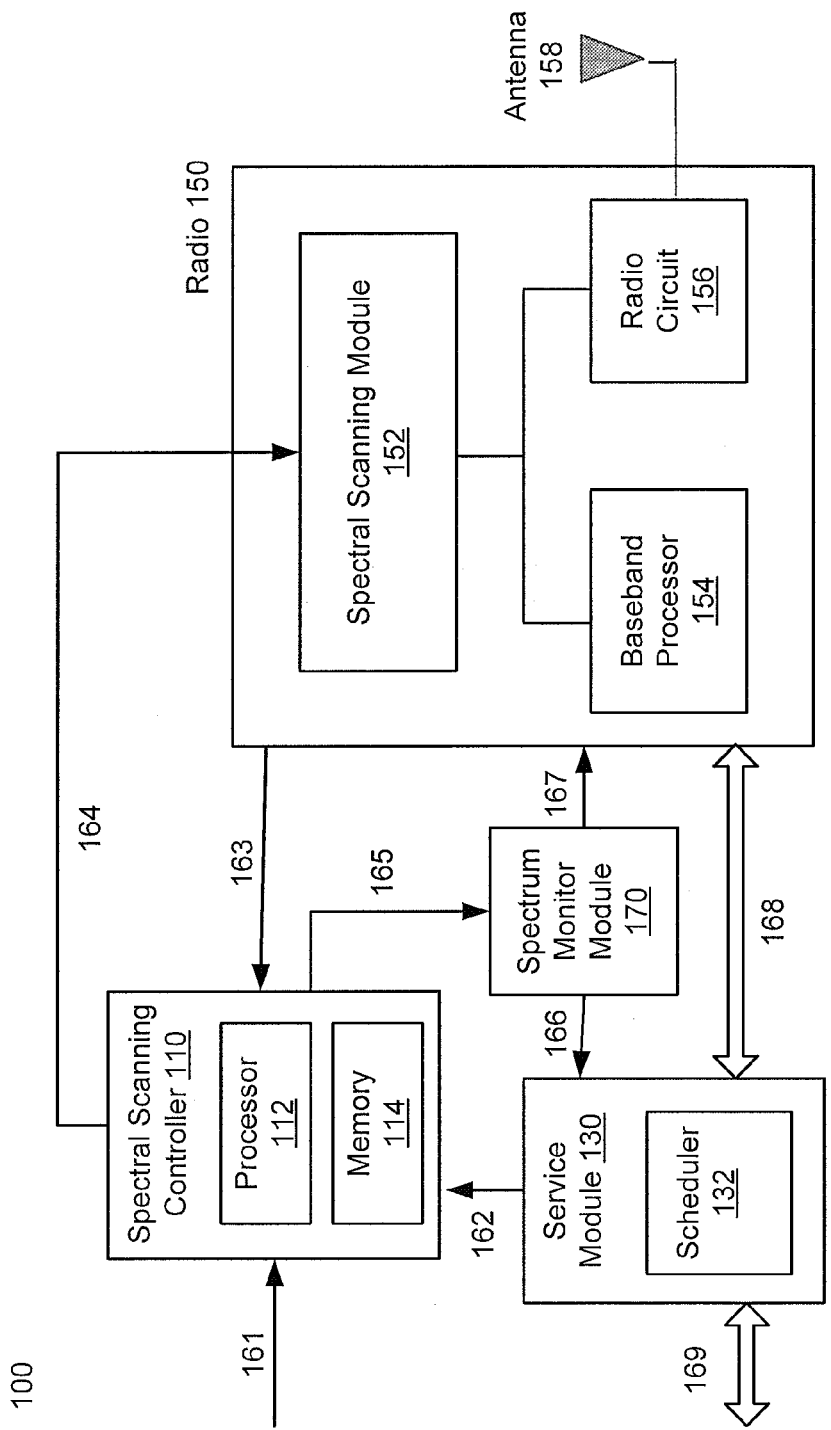
FIG. 1 is a schematic illustration of a spectral scanning system, according to an embodiment.

In some embodiments, an apparatus includes a spectral scanning controller configured to interrupt service at a wireless access point (WAP) such that the WAP performs spectral scanning during service interruption. The spectral scanning controller is configured to interrupt service at the WAP for a first duration of time at a first scanning frequency when the spectral scanning controller is in a first configuration. In some embodiments, the first scanning frequency is based at least in part on a spectral scanning weight associated with a preference to allocate a specific proportion of time to spectral scanning via the WAP. The spectral scanning controller is configured to interrupt service at the WAP for a second duration of time at a second scanning frequency when the spectral scanning controller is in a second configuration. The first duration of time is different than the second duration of time, and the first scanning frequency is different from the second scanning frequency. Furthermore, the spectral scanning controller is configured to move from the first configuration to the second configuration in response to a change in at least one of a service demand, a service quality, a spectral scanning demand or a spectral scanning quality. In some embodiments, the spectral scanning controller is configured to move from the first configuration to the second configuration in response to at least one of a value of the service demand crossing a service demand threshold, a value of the service quality crossing a service quality threshold, a value of the spectral scanning demand crossing a spectral scanning demand threshold or a value of the spectral scanning quality crossing a spectral scanning quality threshold.

In some embodiments, the spectral scanning controller is configured to produce a first number of spectral reports at the first scanning frequency when the spectral scanning controller is in the first configuration. The spectral scanning controller is configured to produce a second number of spectral reports at the first scanning frequency when the spectral scanning controller is in a third configuration, where the first number of spectral reports is different than the second number of spectral reports. Furthermore, the spectral scanning controller is configured to move from the first configuration to the third configuration in response to a change in at least one of a service demand, a service quality, a spectral scanning demand or a spectral scanning quality.

In some embodiments, the spectral scanning controller is configured to define, based on the spectral scanning, at least one spectral report. The spectral scanning controller is further configured to send the at least one spectral report to a spectrum monitor module such that the spectrum monitor module classifies an interference source using the at least one spectral report, or changes a channel of the WAP based on the at least one spectral report. In some embodiments, a first amount of time is allocated to spectral scanning when the spectral scanning controller is in the first configuration, and a second amount of time is allocated to spectral scanning when the spectral scanning controller is in the second configuration, where the first amount of time is different than the second amount of time.

As used herein, a module can be, for example, any assembly and/or set of operatively-coupled electrical components, and can include, for example, a memory, a processor, electrical traces, optical connectors, software (executing or to be executed in hardware) and/or the like.

As used herein, the singular forms "a," "an" and "the" include plural referents unless the context clearly dictates otherwise. Thus, for example, the term "a service module" is intended to mean a single hardware device (with software executed on the hardware) or a combination of devices associated with providing wireless services.

FIG. 1 is a schematic illustration of a spectral scanning system 100, according to an embodiment. The spectral scanning system 100 includes a spectral scanning controller 110 including a processor 112 and a memory 114; a service module 130 including a scheduler 132; a spectrum monitor module 170; and a radio 150 including a spectral scanning module 152, a baseband processor 154, a radio circuit 156 and an antenna 158. In some embodiments, the spectral scanning system 100 can be implemented at a wireless communication device, or any type of device that is equipped with a transceiver and configured to be wirelessly coupled to and communicate with one or more other devices. Such a wireless communication device can be, for example, a wireless access point (WAP), a Wi-Fi enabled laptop, a Bluetooth device, a mobile device, a cellular phone, etc. In some other embodiments, the spectral scanning system 100 can be hosted at multiple devices, each of which can include one or more components and/or modules of the spectral scanning system 100 shown in FIG. 1.

In some embodiments, the wireless communication device hosting the spectral scanning system 100 can be included within, for example, a wireless local area network (WLAN), a Wi-Fi network, a wireless mesh network, a wireless metropolitan area network (MAN), a wireless wide area network (WAN), a mobile device network (e.g., a global system for mobile communications (GSM) network, a personal communications service (PCS) network), a radio access network (RAN), and/or the like.

As shown in FIG. 1, each module or component of the spectral scanning system 100 is operatively coupled to each remaining module or component. In some embodiments, each module or component of the spectral scanning system 100 can be a combination of hardware and/or software (stored and/or executing in hardware) capable of performing one or more specific functions associated with that module or component. In some embodiments, each of the spectral scanning controller 110, the service module 130, the spectrum monitor module 170 and the radio 150 can include, for example, a field-programmable gate array (FPGA), an application specific integrated circuit (ASIC), a digital signal processor (DSP), and/or the like.

In some embodiments, the radio 150 includes the hardware and/or software (stored and/or executing in hardware) responsible for transmitting and/or receiving packets (e.g., data packets, control packets) using, for example, radio frequency (RF) waves. Using the radio 150, the wireless communication device hosting the spectral scanning system 100 can provide wireless services to one or more clients that are wirelessly coupled to the wireless communication device. In some embodiments, the radio 150 can operate in one or more channels such that packets associated with the wireless services can be transmitted from and/or received at the radio 150 in those channels.

Although the spectral scanning system 100 is described with respect to FIG. 1 as including a radio component (i.e., the radio 150), the operating frequencies of the radio(s) associated with a spectral scanning system need not be limited within the RF frequency range (i.e., about 300 kHz to 300 GHz) but can operate at other frequencies. In some embodiments, a spectral scanning system can have, for example, a transceiver operating (e.g., listening, scanning, transmitting, receiving) at any frequency channels. In some embodiments, the radio 150 can be configured to transmit and/or receive packets using any wireless transmission methods such as Wi-Fi, Bluetooth, etc.

As shown in FIG. 1, the radio 150 includes the spectral scanning module 152, the baseband processor 154, the radio circuit 156, and the antenna 158. The baseband processor 154 can be, for example, an integrated circuit or part of an integrated circuit that manages part or all the radio functions (i.e., the functions that involve an antenna such as the antenna 158). In some embodiments, the baseband processor 154 can also manage functions with other type of wireless communications such as Wi-Fi and/or Bluetooth. The radio circuit 156 can include a circuitry configured to control the operations of the antenna 158, including transmitting and/or receiving packets through the antenna 158. The spectral scanning module 152 can be configured to control the spectral scanning operations that are executed by the radio 150, as described in further details below.

The service module 130 includes the hardware and/or software (stored and/or executing in hardware) responsible for providing wireless services to the clients operatively coupled to the wireless communication device hosting the spectral scanning system 100. Such wireless services can include, for example, connecting a client to a server or other clients, retrieving data from the server to the client, receiving data from the client, and/or so forth.

Specifically, the service module 130 can receive commands, instructions, and/or information (shown as the signal 169 in FIG. 1) associated with providing wireless services from other components of the wireless communication device hosting the spectral scanning system 100, or from a user (e.g., an administrator, an operator) of the wireless communication device (e.g., through an input device and/or user interface). In some embodiments, the service module 130 can receive information associated with service requirement(s) and/or service quality for the wireless services that are provided. Based on the received commands, instructions, and/or other information, the scheduler 132 can be configured to determine a schedule for providing the wireless services. Specifically, the scheduler 132 can determine the appropriate operations (e.g., listening, transmitting, receiving, being idle, etc.) for the radio 150 at any given time during the period when the wireless communication device is in a service mode (i.e., providing wireless services to clients). The service module 130 can then send a signal (shown as the signal 168 in FIG. 1) to the radio 150, such that the radio 150 can execute the operations associated with providing wireless services to the clients as scheduled by the scheduler 132.

As shown in FIG. 1, the spectral scanning controller 110 includes the memory 114 and the processor 112. The memory 114 can be, for example, a random-access memory (RAM) (e.g., a dynamic RAM, a static RAM), a flash memory, a removable memory, and/or so forth. In some embodiments, the memory 114 can include and/or store, for example, a database, process, application, algorithm, virtual machine, and/or some other software modules (stored and/or executing in hardware) or hardware modules configured to control the spectral scanning process and/or associated operations. In such embodiments, instructions and/or algorithms of controlling the spectral scanning operations can be stored within the memory 114 and executed at the processor 112.

The processor 112 can be configured to, for example, write data into and read data from the memory 114, and execute the instructions and/or algorithms stored within the memory 114. Furthermore, the processor 112 can be configured to control the operations of other modules and/or components (not shown in FIG. 1) of the spectral scanning controller 110. In some embodiments, under the control of the processor 112 and based on the instructions and/or algorithms stored within the memory 114, the spectral scanning controller 110 can be configured to control spectral scanning operations that are executed at the radio 150, as described in further details below.

The spectrum monitor module 170 includes the hardware and/or software (stored and/or executing in hardware) configured to process the data and/or information collected from the spectral scanning operations. As described in detail below, the spectrum monitor module 170 can be configured to detect and monitor interferences, classify interference sources, and take appropriate actions (e.g., spectral mitigation) based on the results of spectral scanning.

The spectral scanning system 100, including the spectral scanning controller 110, the service module 130, the spectrum monitor module 170 and the radio 150, can be configured to perform spectral scanning for the wireless communication device hosting the spectral scanning system 100. Specifically, the spectral scanning system 100 can be configured to interrupt wireless services provided by the wireless communication device, and scan the spectrum to gather useful spectral information, such that interferences in the vicinity of the wireless communication device can be detected and classified, and further actions can be taken at the wireless communication device accordingly. In some embodiments, the potential interferences resource can include, for example, microwave, Bluetooth devices, frequency-hopping spread spectrum (FHSS) phones, and/or the like.

The spectral scanning controller 110 can be configured to receive input associated with spectral scanning from other components and/or modules of the wireless communication device. As shown in FIG. 1, the spectral scanning controller 110 can be configured to receive, for example, system status from other components, modules, processors and/or memories (not shown in FIG. 1) of the wireless communication device via the signal 161, service status from the service module 130 via the signal 162, and media status from the radio 150 via the signal 163. The system status can include information associated with the operational status of the wireless communication device, such as the status of allocated resources (e.g., CPU, storage, etc.). The service status can include information associated with service demand and/or service quality for the wireless services that are provided by the wireless communication device. For example, the service status can include information associated with the tasks of wireless services that are queued at the service module 130 and wait to be executed by the radio 150. For another example, the service status can include information associated with the quality of a specific wireless service in terms of packet error rate (PER). The media status can include information associated with the status of the spectrum, such as data collected from the spectral scanning at the radio 150. In some embodiments, the media status received from the radio 150 can include the raw data collected from the spectral scanning. In some other embodiments, the media status received from the radio 150 can include results (e.g., spectral reports) that have been processed, at the radio 150, from the raw data collected from the spectral scanning. In some embodiments, for example, the media status can include a level of medium utilization on a specific spectrum corresponding to a channel on which a wireless access point (WAP) is operating. For example, medium utilization on a channel can be high due to many wireless activities, including interferences, on that spectrum. Such wireless activities can increase a packet error rate (PER) and/or make providing wireless service more difficult. In situations where the media status indicates a high medium utilization more radio resources can be allocated for wireless service and less spectral scanning can be performed. In other embodiments, more aggressive spectral scanning can be performed to classify any interferences for mitigation.

After receiving the various inputs described above, the spectral scanning controller 110 can be configured to determine a first spectral scanning configuration based on a predetermined spectral scanning method. Such a predetermined spectral scanning method can be stored in the memory 114 and executed by the processor 112. In some embodiments, when the first spectral scanning configuration is determined at the spectral scanning controller 110, the spectral scanning controller 110 is at a first configuration. To determine a spectral scanning configuration (e.g., a first spectral scanning configuration or a second spectral scanning configuration), the spectral scanning controller 110 can be configured to determine values for a set of parameters that are associated with the spectral scanning. Such parameters include, for example, a scanning frequency, a spectral scan duration, a number of spectral reports, etc.

Figure 2:
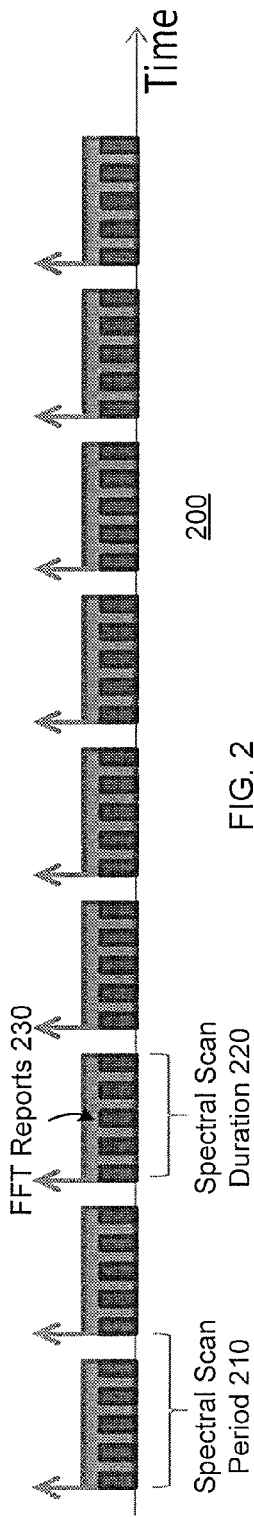
FIG. 2 is a schematic illustration of a timeline for a spectral scanning configuration, according to an embodiment.

FIG. 2 is a schematic illustration of a timeline for a spectral scanning configuration 200, according to an embodiment. Such a spectral scanning configuration can be determined based on values of a set of parameters, including a value of a scanning frequency (e.g., reciprocal of the spectral scan period 210), a value of a spectral scan duration (e.g., the spectral scan duration 220), a number associated with spectral reports (e.g., 5 fast Fourier transform (FFT) reports 230 per spectral scan duration 220), a value of a total time duration, and/or the like. In some embodiments, the spectral scanning configuration 200 can be determined at, for example, a spectral scanning controller similar to the spectral scanning controller 110 shown and described with respect to FIG. 1. In some embodiments, the spectral scanning configuration 200 can be implemented at, for example, a radio similar to the radio 150 shown and described with respect to FIG. 1.

According to the spectral scanning configuration 200, the radio (e.g., the radio 150 in FIG. 1) that implements the spectral scanning configuration 200 can activate or start spectral scanning with the scanning frequency. That is, the radio can activate or start scanning the spectrum at the beginning of each spectral scan period (e.g., the spectral scan period 210), where the duration of each spectral scan period is calculated as the reciprocal of the scanning frequency. Within each spectral scan period, spectral scanning is continuously operated for a fixed spectral scan duration (e.g., the spectral scan duration 220). After each spectral scan duration, the radio can be configured to be idle or provide wireless services until the beginning of the next spectral scan period.

Within each spectral scan duration, signals detected in spectral scanning can be sampled and the measurements can be recorded within a number of discrete sampling windows. After each sampling window, a spectral report that contains data associated with the measurements recorded for that sampling window can be produced. In some embodiments, data associated with the measurements can be processed by using, for example, FFT, before being included in the spectral reports. In such embodiments, the resulting spectral reports can also be known as FFT reports, as shown in FIG. 2 as FFT reports 230. In other embodiments, data associated with the measurements can be processed by using any other suitable signal processing methods such as, for example, fractional Fourier transform (FRFT), linear canonical transform (LCT), Laplace transform (LT), etc. In some embodiments, the number of spectral reports produced within each spectral scan duration (or in other words, the number of sampling windows within each spectral scan duration) can be determined based on, for example, a sampling frequency. In the example of FIG. 2, signals can be sampled by scanning the spectrum at a sampling frequency within each spectral scan duration (e.g., the spectral scan duration 220) such that 5 FFT reports 230 can be produced within each spectral scan duration.

In some embodiments, the set of parameters associated with a spectral scanning configuration can include a total time duration, which limits the time span that the spectral scanning configuration is implemented at a radio. After the total time duration, the radio can be configured to stop scanning the spectrum (e.g., back to idle or providing wireless service). In some embodiments, based on the values for the total time duration and the spectral scan period (i.e., scanning frequency), a total time duration can include one or multiple segments of spectral scan duration. In the example of FIG. 2, the set of values of the parameters for the spectral scanning configuration 200 can include a value of the total time duration such that the spectral scanning will be terminated at the radio after 9 spectral scan periods. Similarly stated, the total time duration for the spectral scanning configuration 200 includes 9 segments of spectral scan duration 220. In other embodiments, without such a total time duration or any other parameter that defines the time span for implementing the spectral scanning configuration, the radio can operate spectral scanning according to the spectral scanning configuration until receiving a new instruction to, for example, terminate the spectral scanning, change to another spectral scanning configuration, or switch to providing wireless services.

In some embodiments, as described with respect to FIG. 1, values for the parameters of a spectral scanning configuration can be determined based on various inputs received at the spectral scanning controller (e.g., the spectral scanning controller 110 in FIG. 1). Particularly, values of some parameters such as the value of the spectral scan duration can be determined based at least in part on a spectral scanning weight, which is associated with a preference to allocate a specific proportion of time to spectral scanning at the radio. In some embodiments, such a spectral scanning weight can be determined by a spectral scanning method executed at the spectral scanning controller. In some embodiments, the spectral scanning weight can be represented by or associated with a value representing the desired proportion of the total time duration that is to be spent on spectral scanning. For example, as shown in FIG. 2, the spectral scan duration 220 can be determined based on the spectral scan period 210 (i.e., the reciprocal of a given scanning frequency) and a given value representing the desired proportion of the total time duration that is to be spent on spectral scanning. Such a given value can be, for example, 85% (i.e., approximately the ratio of the spectral scan duration 220 to the spectral scan period 210), 50%, 25%, 10%, 5%, 1%, 0.1%, etc.

Returning to FIG. 1, if one or more of the inputs (e.g., signals 161, 162, 163) to the spectral scanning controller 110 change or the spectral scanning method executed at the spectral scanning controller 110 is changed (e.g., updated by an operator), the spectral scanning controller 110 can be configured to determine a second spectral scanning configuration that is different than the first spectral scanning configuration. That is, at least one parameter for the second spectral scanning configuration has a value different from the value for that parameter in the first spectral scanning configuration. In some embodiments, when the second spectral scanning configuration is determined at the spectral scanning controller 110, the spectral scanning controller 110 is at a second configuration that is different than the first configuration.

In some embodiments, the spectral scanning controller 110 can be configured to move (e.g., change, switch, select) from one configuration to another configuration in response to a change in at least one of a service demand, a service quality, a spectral scanning demand or a spectral scanning quality. As a result, a new spectral scanning configuration corresponding to the change in the service demand, service quality, spectral scanning demand and/or spectral scanning quality can be determined at the spectral scanning controller 110. For example, the spectral scanning controller 110 can be configured to move from one configuration to another configuration in response to the number of service tasks that are queued to be served at the service module 130 being increased from 0 to 1. As a result, a new spectral scanning configuration with a reduced scanning frequency can be determined at the spectral scanning controller 110.

In some embodiments, the spectral scanning controller 110 can be configured to move from one configuration to another configuration in response to (1) a value of the service demand crossing a service demand threshold, (2) a value of the service quality crossing a service quality threshold, (3) a value of a spectral scanning demand crossing a spectral scanning demand threshold and/or (4) a spectral scanning quality crossing a spectral scanning quality threshold. As a result, a new spectral scanning configuration corresponding to the change in the service demand, service quality, spectral scanning demand and/or spectral scanning quality can be determined at the spectral scanning controller 110. For example, the spectral scanning controller 110 can be configured to move from one configuration to another configuration in response to the PER associated with a wireless service being decreased and crossing a predetermined threshold. As a result, a new spectral scanning configuration can be determined at the spectral scanning controller 110 based on an increased spectral scanning weight (i.e., a preference to allocate a higher proportion of time to spectral scanning at the radio).

In some embodiments, an adaptation method can be used at the spectral scanning controller 110 to make changes to the spectral scanning configuration determined at the spectral scanning controller 110. Such an adaptation method can use, for example, the degree of the RF service demand, the status of allocated resources (e.g., storage) for the RF service, the availability of media, and other useful information and measures to quantify the RF service quality and/or service demand to adjust the scanning behavior via changes to the spectral scanning configuration.

Figure 3:
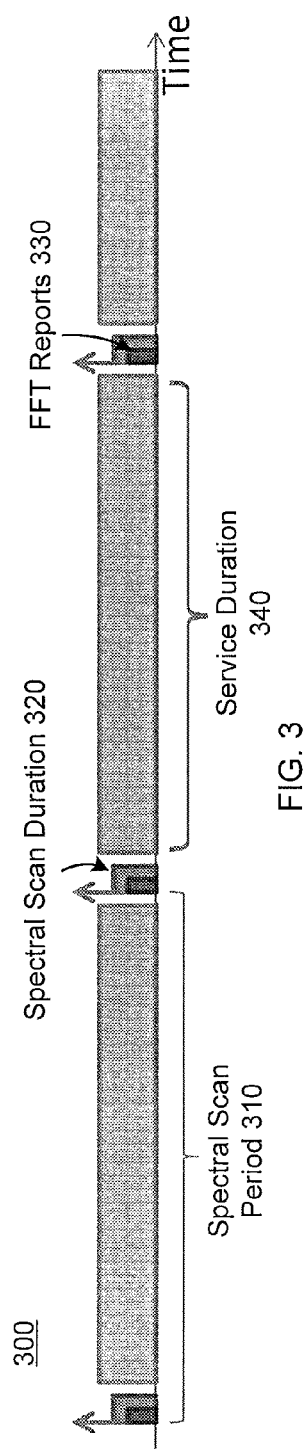
FIG. 3 is a schematic illustration of a timeline for a spectral scanning configuration, according to another embodiment.

FIG. 3 is a schematic illustration of a timeline for a spectral scanning configuration 300, according to another embodiment. The spectral scanning configuration 300 can be determined based on a set of values of the parameters similar to the set of values of the parameters used to define the timeline for the spectral scanning configuration 200 shown and described with respect to FIG. 2. The set of values of the parameters for the spectral scanning configuration 300 includes, for example, a value of the scanning frequency (e.g., reciprocal of the spectral scan period 310), a value of the spectral scan duration (e.g., the spectral scan duration 320), a number associated with spectral reports (e.g., 1 FFT report 330 per spectral scan duration 320), a value of the service duration (e.g., the service duration 340), a value of the total time duration, and/or the like. Similar to the spectral scanning configuration 200, the spectral scanning configuration 300 can be determined at a spectral scanning controller similar to the spectral scanning controller 110 in FIG. 1, and implemented at a radio similar to the radio 150 in FIG. 1.

Among the values of the parameters, the spectral scan period 310 is similar to the spectral scan period 210, and the spectral scan duration 320 is similar to the spectral scan duration 220. As shown in FIG. 3, signals can be sampled from scanning the spectrum at a sampling frequency associated with the spectral scanning configuration 300 within each spectral scan duration (e.g., the spectral scan duration 320) such that only 1 FFT report 330 is produced within each spectral scan duration. Additionally, in this example, the total time duration for the spectral scanning configuration 300 is substantially equal to the total time duration for the spectral scanning configuration 200.

In some embodiments, the set of parameters associated with a spectral scanning configuration can include a service duration, which defines the time span that the radio provides wireless services within a spectral scan period. Specifically, after each spectral scan duration within a spectral scan period, the radio is configured to provide wireless services to clients during such a service duration. After the service duration, that spectral scan period is completed and the radio is ready for the next spectral scan period. In some embodiments, multiple segment pairs of spectral scan durations and service durations can be included in the total time duration, where each service duration is preceded by a spectral scan duration. Similarly stated, the radio can be configured to perform spectral scanning in a spectral scan duration and to provide wireless service in a service duration in turns. In the example of FIG. 3, each spectral scan period (e.g., the spectral scan period 310) includes a spectral scan duration (e.g., the spectral scan duration 320) and a service duration (e.g., the service duration 340). In other words, the spectral scan period can be (substantially) the sum of the spectral scan duration and the service duration.

In some embodiments, the spectral scan duration and the service duration can be determined based at least in part of the spectral scanning weight that is associated with the preference to allocate a specific proportion of time to spectral scanning at the radio. Specifically, the ratio of the spectral scan duration (e.g., the spectral scan duration 320) to the spectral scan period (e.g., the spectral scan period 310, the reciprocal of the scanning frequency) can be (substantially) determined based on the proportion of time that is desired to be dedicated to spectral scanning. For example, as shown in FIG. 3, the spectral scan duration 320 and the service duration 340 can be determined based on the spectral scan period 310 (i.e., the reciprocal of a given scanning frequency) and a given value representing the desired proportion of the total time duration that is to be spent on spectral scanning. Such a given value can be, for example, 4% (i.e., the ratio of the spectral scan duration 320 to the spectral scan period 310).

Returning to FIG. 1, in some embodiments, when the system status (e.g., via the signal 161), the media status (e.g., via the signal 163) and/or the service status (e.g., via the signal 162) received at the spectral scanning controller 110 indicate low activity levels for providing wireless services at the radio 150, the wireless communication device hosting the radio 150 can be considered to be in an idle mode. In response to such an idle mode, the spectral scanning controller 110 can be configured to determine a spectral scanning configuration such that spectral scanning can be performed more frequently to detect interference sooner and more accurately. Such a spectral scanning configuration can be similar to, for example, the spectral scanning configuration 200 described with respect to FIG. 2. Specifically, according to the spectral scanning configuration 200, substantially 85% of the total time duration is dedicated to spectral scanning, while no wireless service is provided during the time span when the spectral scanning configuration 200 is implemented at the radio.

On the contrary, in some embodiments, when the system status, the media status and/or the service status received at the spectral scanning controller 110 indicate high activity levels for providing wireless services at the radio 150, the wireless communication device hosting the radio 150 can be considered to be in an active mode. In response to such an active mode, the spectral scanning controller 110 can be configured to determine a spectral scanning configuration such that spectral scanning activity can be reduced to avoid, minimize, or reduce interruption of wireless services. Such a spectral scanning configuration can be similar to, for example, the spectral scanning configuration 300 described with respect to FIG. 3. Specifically, according to the spectral scanning configuration 300, substantially 4% of the total time duration is dedicated to spectral scanning, and substantially 88% of the total time duration is dedicated to providing wireless services.

In other embodiments, when the system status, the media status, and/or the service status received at the spectral scanning controller 110 indicate a change in the spectral scanning demand and/or the spectral scanning quality, the spectral scanning controller 110 can be configured to determine a spectral scanning configuration such that the radio 150 provides sufficient spectral scanning reports to the spectrum monitor module 170. For example, due to different radio frequency (RF) characteristics of interferences and/or other wireless devices, per sampling theory, the spectral scanning pattern can be adopted so that the radio 150 can provide sufficient reports to the spectrum monitor module 170 such that the spectrum monitor module 170 can classify the interferences and/or other wireless devices. Therefore, the spectral scanning configuration and pattern can be changed dynamically to meet the spectral scanning demand/goal and spectral scanning quality in addition to the service levels of the radio 150.

After a spectral scanning configuration (e.g., the spectral scanning configuration 200 in FIG. 2, the spectral scanning configuration 300 in FIG. 3) is determined at the spectral scanning controller 110, the spectral scanning controller 110 can be configured to send the spectral scanning configuration to the spectral scanning module 152 of the radio 150 via the signal 164. In some embodiments, the spectral scanning controller 110 can be configured to send the set of values of the parameters that collectively define the spectral scanning configuration. In the example of FIG. 2, the set of values of the parameters including the value of the scanning frequency (i.e., the reciprocal of the spectral scan period 210), the value of the spectral scan duration 220, the number of FFT reports 230 (i.e., the reciprocal of the sampling frequency, 5 per spectral scan duration 220), and the value of the total time duration is sent from the spectral scanning controller to the radio. In the example of FIG. 3, the set of values of the parameters including the value of the scanning frequency (the reciprocal of the spectral scan period 310), the value of the spectral scan duration 320, the number of FFT reports 330 (i.e., 1 per spectral scan duration), the value of the total time duration, and the value of the service duration 340 is sent from the spectral scanning controller to the radio.

In response to receiving the set of values of the parameters for the spectral scanning configuration, the spectral scanning module 152 can be configured to implement the spectral scanning configuration at the radio 150. As a result, the components of the radio 150, including the spectral scanning module 152, the baseband processor 154, the radio circuit 156 and the antenna 158, can be configured to collectively perform spectral scanning and/or to provide wireless services according to the spectral scanning configuration. Specifically, the antenna 158 is idle, providing wireless services (transmitting or receiving data packets), or scanning the spectrum at any given time according to the spectral scanning configuration.

As a result of spectral scanning, the radio 150 can receive measurements of the signals that are detected in spectral scanning during each sampling window. As described with respect to FIG. 2, a spectral report (e.g., an FFT report) can be produced by processing the measurements for each sampling window using, for example, a signal processing method (e.g., FFT). In some embodiments, the spectral reports can be produced at the spectral scanning module 152 and then sent to the spectral scanning controller 110 via the signal 163 (e.g., as part of the media status). In such embodiments, the raw measurements are not provided to the spectral scanning controller 110. In some other embodiments, the spectral reports can be produced at the spectral scanning controller 110. In such embodiments, the raw measurements are sent from the radio 150 to the spectral scanning controller 110 via the signal 163 (e.g., as port of the media status). In still other embodiments, the spectral scanning module 152 of the radio 150 sends the spectral reports (via physical layer (PHY) error frames) to the service module 130 via the signal 168. The service module 130 can detect the spectral reports as spectral scanning reports and send them to the processor 112 of the spectral scanning controller 110. The processor 112 can then process the spectral reports. After processing the spectral reports, the spectral scanning control can send the processed information to the spectrum monitor module 170 for classification.

In some embodiments, the spectral scanning controller 110 can be configured to send the resulting spectral reports to the spectrum monitor module 170. Based on the received spectral reports, the spectrum monitor module 170 can be configured to, for example, detect and monitor RF spectrum activities, identify and classify interference sources, and/or the like. In some embodiments, the spectrum monitor module 170 can be configured to detect RF spectrum activity by using, for example, an interference identification algorithm. In some embodiments, the spectrum monitor module 170 can also be configured to derive data about the RF spectrum activities and provide visibility into the users of the shared spectrum. For example, based on the spectral reports, the spectrum monitor module 170 can be configured to identify and classify an interference source, and evaluate its impact to the operation of the wireless communication device hosting the spectral scanning system 100.

In some embodiments, based on the received spectral reports, the spectrum monitor module 170 can be configured to modify the operating configuration and/or change the behavior of other components of the wireless communication device hosting the spectral scanning system 100. In such embodiments, as shown in FIG. 1, the spectrum monitor module 170 can be configured to send a signal 166 to the service module 130 and/or send a signal 167 to the radio 150, such that appropriate actions can be taken at the service module 130 and/or the radio 150 accordingly. For example, the spectrum monitor module 170 can be configured to send signals to other components (e.g., the radio 150) of the wireless communication device such that an operation channel of the wireless communication device is changed (e.g., replaced by a better channel). In some embodiments, other actions such as spectral mitigation and troubleshooting can also be initiated by the spectrum monitor module 170 based on the spectral reports.

Figure 4:
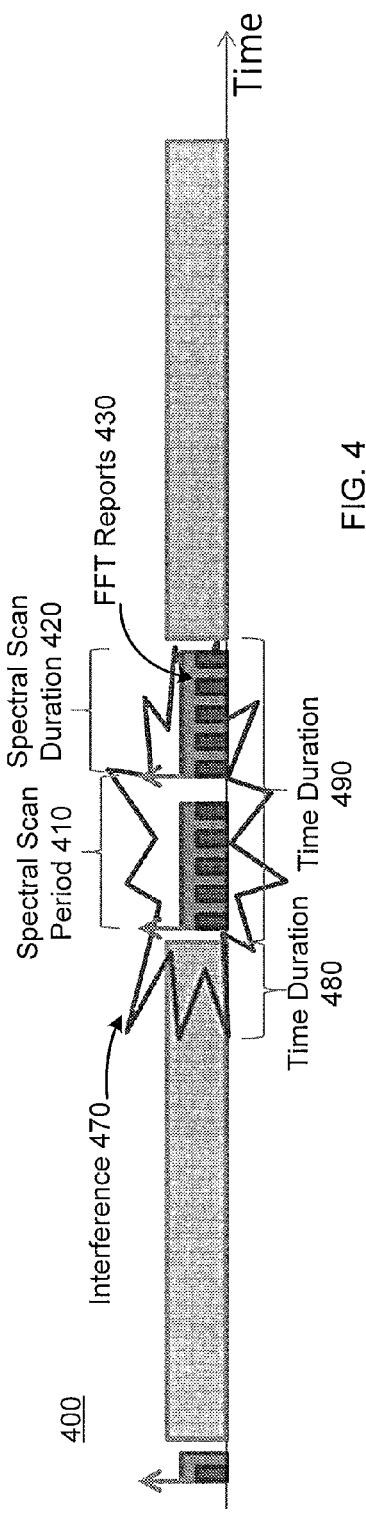
FIG. 4 is a schematic illustration of a timeline for a spectral scanning configuration, according to yet another embodiment.

In some embodiments, beginning and/or termination of the spectral scanning can be triggered by specific events (e.g., related to an intermittent interference) occurring to a wireless communication device, such that an intermittent interference can be captured. In such embodiments, a spectral scanning configuration without a fixed total time duration can be determined at the spectral scanning controller of the wireless communication device, and then implemented at the radio of the wireless communication device. FIG. 4 is a schematic illustration of a timeline for such a spectral scanning configuration 400, according to yet another embodiment. Similar to the timeline for the spectral scanning configuration 200 in FIG. 2 and the timeline for the spectral scanning configuration 300 in FIG. 3, the spectral scanning configuration 400 can be determined at a spectral scanning controller (e.g., the spectral scanning controller 110 in FIG. 1) of a wireless communication device, and implemented at a radio (e.g., the radio 150 in FIG. 1) of the wireless communication device.

As shown in FIG. 4, the wireless communication device can be triggered to interrupt providing wireless services and to initiate spectral scanning in response to detecting an interference 470, which affects the wireless service provided by the wireless communication device during the time duration 480. In some embodiments, interruption on wireless services and initiation of spectral scanning can be triggered by, for example, undesired service status (e.g., unacceptable transmission and/or reception for wireless services) that is received at the spectral scanning controller of the wireless communication device. For example, the spectral scanning controller of the wireless communication device can be triggered to interrupt providing a wireless service and to initiate spectral scanning in response to receiving a PER associated with the wireless service that is higher than a predetermined threshold.

As a result of detecting the interference 470, the spectral scanning controller of the wireless communication device can be configured to determine the spectral scanning configuration 400, which is then implemented at the radio of the wireless communication device during the time duration 490. The spectral scanning configuration 400 can be determined based on the set of values of the parameters similar to the set of values of the parameters used to define the spectral scanning configuration 200 in FIG. 2 and the set of values of the parameters used to define the spectral scanning configuration 300 in FIG. 3. The set of values of the parameters for the spectral scanning configuration 400 includes, for example, a value of the scanning frequency (e.g., reciprocal of the spectral scan period 410), a value of the spectral scan duration (e.g., the spectral scan duration 420), a number associated with spectral reports (e.g., 5 FFT reports 430 per spectral scan duration 420), and/or the like. Among the parameters, the spectral scan period 410 is similar to the spectral scan period 210 and the spectral scan period 310; the spectral scan duration 420 is similar to the spectral scan duration 220 and the spectral scan duration 320; the number for FFT reports 430 is similar to the number for FFT reports 230 and the number for FFT reports 330.

In some embodiments, the spectral scanning configuration implemented at a radio of a wireless communication device can be changed to, for example, another spectral scanning configuration or providing wireless services, based on a change in the signals and/or information collected at the wireless communication device. In some embodiments, the change in the signals and/or information can be, for example, a change in the service status (e.g., service quality, service demand), media status, system status, spectral scanning demand, and/or spectral scanning quality received at the spectral scanning controller of the wireless communication device. In the example of FIG. 4, spectral scanning can be operated at the wireless communication device according to the spectral scanning configuration 400 for the time duration 490, when a signal indicating abnormal media status (e.g., high noise floor) is received at the spectral scanning controller of the wireless communication device. At the end of the time duration 490, in response to the received media status being changed to normal (e.g., low noise floor), the wireless communication device can be configured to terminate spectral scanning and start providing wireless services, as shown in FIG. 4. In some embodiments, as an alternative, the wireless communication device can be configured to modify spectral scanning such that the spectral scanning configuration 400 is changed to a different spectral scanning configuration (e.g., with a lower scanning frequency).

In some embodiments, when a spectral scanning controller of a wireless communication device is configured to change a spectral scanning configuration implemented at a radio of the wireless communication device, the spectral scanning controller can be configured to modify a value of one parameter or values of a combination of parameters from the set of parameters that define the spectral scanning configuration. For example, the spectral scanning controller can be configured to modify one or a combination of a value of the scanning frequency (equivalent to the spectral scan period), a value of the spectral scan duration, a value of the service duration, a value of the total time duration, a value of the spectral scanning weight and/or priority, value(s) of the scanning pattern (e.g., a value of the sampling frequency and a value of the sampling window for producing spectral reports), etc.

In some embodiments, each value from the set of values of the parameters that define a spectral scanning configuration can be statistically or dynamically adjusted such that different operation goals can be met under different circumstances associated with the balance between the spectral scanning and the wireless services. In such embodiments, adjustments on the values of the parameters can be made based on, for example, status on system resources, service quality, service demand, media status, spectral scanning demand, spectral scanning quality, etc. For example, the value of the spectral scanning weight can be decreased if more time is needed to be preserved for a wireless service. For another example, the value of the scanning frequency can be increased when devices with a hopping frequency (e.g., Bluetooth devices) are detected.

Figure 5:
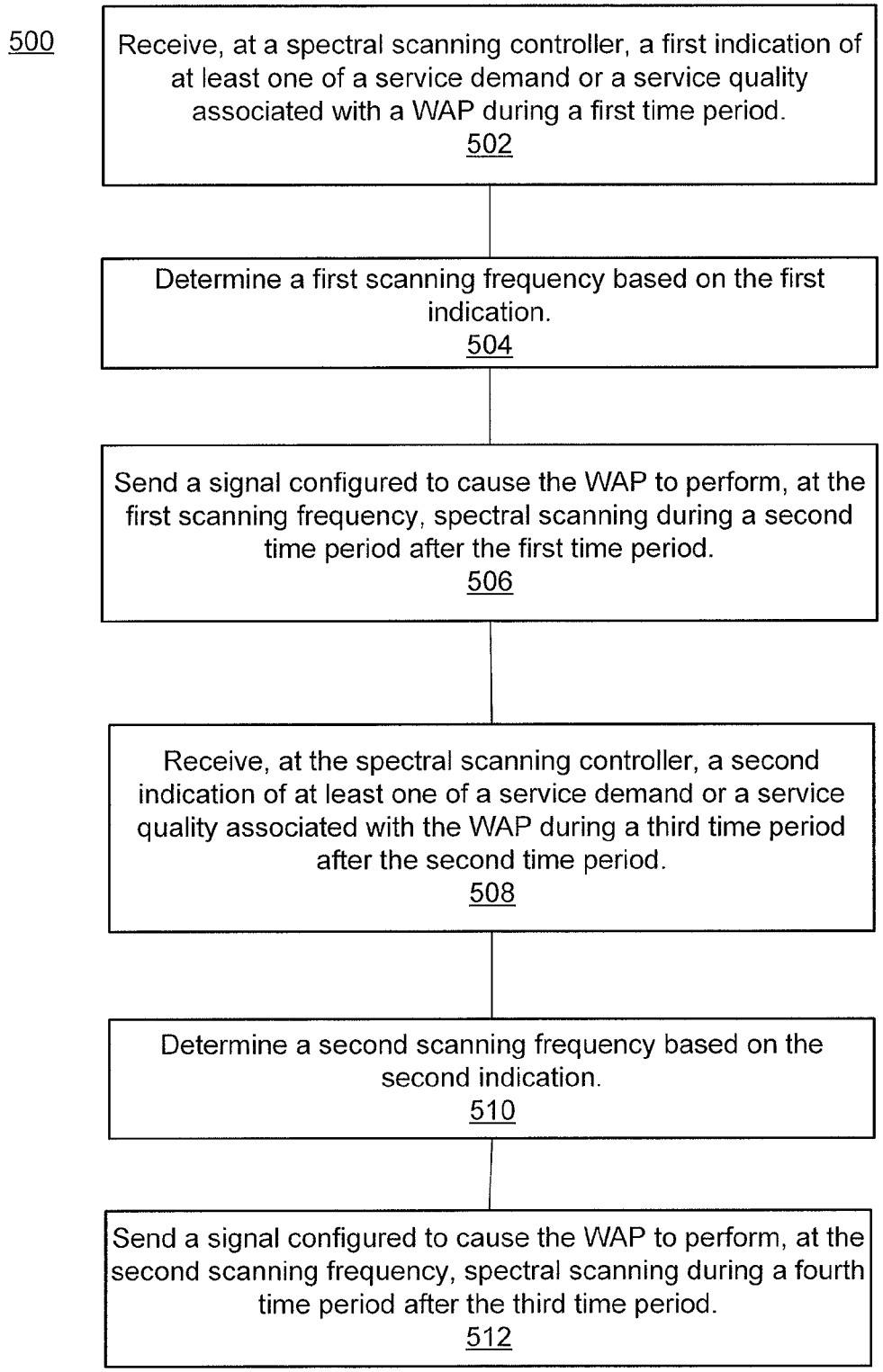
FIG. 5 is a flow chart illustrating a method for performing spectral scanning, according to an embodiment.

FIG. 5 is a flow chart illustrating a method 500 for performing spectral scanning, according to an embodiment. The method 500 can be executed at, for example, a spectral scanning controller of a wireless communication device (e.g., a WAP) operating a radio. The spectral scanning controller and the radio can be structurally and functionally similar to the spectral scanning controller 110 and the radio 150 shown and described with respect to FIG. 1, respectively. Furthermore, other components of a spectral scanning system that includes the spectral scanning controller can be structurally and functionally similar to the respective components of the spectral scanning system 100 shown and described with respect to FIG. 1.

At 502, a first indication can be received at the spectral scanning controller. The first indication can include information of, for example, a service demand and/or a service quality associated with the WAP during a first time period. Such information can be received from, for example, a service module of the WAP. In some embodiments, the first indication can also include other information associated with system status and media status. In the example of FIGS. 1-3, a first indication including information associated with service status (e.g., a service demand, a service quality) during a first time period can be received from the service module 130 at the spectral scanning controller 110 via the signal 162. Additionally, information associated with system status during the first time period can be received at the spectral scanning controller 110 via the signal 161, and information associated with media status during the first time period can be received from the radio 150 at the spectral scanning controller 110 via the signal 163.

At 504, a first value of a scanning frequency can be determined based on the first indication. The first value of the scanning frequency can be included in a first set of values of parameters that define a first spectral scanning configuration. The first set of values of parameters also includes, for example, a value of a spectral scan duration, value(s) of a scanning pattern (e.g., a value of a sampling frequency and a value of a sampling window for producing spectral reports), and/or the like. In some embodiments, the first set of values of parameters including the first value of the scanning frequency can be determined based on the first indication and a value of a spectral scanning weight associated with a preference to allocate a specific proportion of a time period to spectral scanning via the WAP. Such a value of the spectral scanning weight can be used to determine the value of the spectral scan duration for a given value of the spectral scan period (e.g., reciprocal of the first value of the scanning frequency).

In the example of FIGS. 1-3, values of the parameters that define the spectral scanning configuration 200 can be determined at the spectral scanning controller 110. The values of the parameters can include, for example, a first value of the scanning frequency (i.e., reciprocal of the spectral scan period 210), the spectral scan duration 220, a value of the sampling frequency and a value of the sampling window associated with producing FFT reports 230, etc. In some embodiments, the values of the parameters can be determined based on the first indication and other information received at the spectral scanning controller 110 such as, for example, a spectral scanning weight associated with a preference to allocate a specific proportion of a time period to spectral scanning via the WAP.

At 506, a signal can be sent from the spectral scanning controller, where the signal is configured to cause the WAP to perform, at the first value of the scanning frequency, spectral scanning during a second time period after the first time period. In some embodiments, the first value of the scanning duration can be determined based on the first indication. The signal can be configured to cause the WAP to perform the spectral scanning at the first value of the scanning frequency for the first value of the scanning duration. In some embodiments, a first amount of spectral reports can be determined based on the first indication. The signal can be configured to cause the WAP to perform the spectral scanning at the first value of the scanning frequency to produce the first amount of spectral reports. In some embodiments, a signal associated with spectral scanning results can be received after the second time period. Furthermore, one or more spectral reports can be defined based on the spectral scanning results, and the one or more spectral reports can be sent to a spectrum monitor module. As a result, the spectrum monitor module can change a channel of the WAP based on the one or more spectral reports.

In the example of FIGS. 1-3, the spectral scanning controller 110 can be configured to send the signal 164 to the radio 150, such that the radio 150 can perform spectral scanning according to the spectral scanning configuration 200 for a second time period after the first time period. As shown in FIG. 2, the spectral scanning configuration 200 is defined based on at least the first value of the scanning frequency (i.e., reciprocal of the spectral scan period 210), spectral scan duration 220, and a number associated with the FFT reports 230 (i.e., 5 FFT reports 230 per spectral scan duration 220). As a result, the signal can be configured to cause the radio 150 to perform the spectral scanning at the first value of the scanning frequency for the spectral scan duration 220.

In some embodiments, signals associated with spectral scanning results can be received at the spectral spanning controller 110, and the FFT reports 230 can be defined based on the spectral scanning results at the spectral spanning controller 110. In some other embodiments, signals associated with spectral scanning results can be received at the spectral scanning module 152, and FFT reports 230 can be defined based on the spectral scanning results at the spectral scanning module 152, and then sent to the spectral scanning controller 110 via the signal 163. According to the spectral scanning configuration 200, 5 FFT reports 230 can defined for each spectral scan duration. The FFT reports can be sent from the spectral scanning controller 110 to the spectrum monitor module 170 via the signal 165. As a result, the spectrum monitor module 170 can change a channel of the WAP based on the received FFT reports 230.

At 508, a second indication can be received at the spectral scanning controller. The second indication can include information of, for example, a service demand and/or a service quality associated with the WAP during a third time period after the second time period. Similar to the first indication, the information included in the second indication can be received from, for example, a service module of the WAP. In some embodiments, the second indication can also include other information associated with system status and media status. In the example of FIGS. 1-3, a second indication including information associated with service status (e.g., a service demand, a service quality) during a third time period after the second time period can be received from the service module 130 at the spectral scanning controller 110. Additionally, information associated with system status during the third time period can be received at the spectral scanning controller 110, and information associated with media status during the third time period can be received from the radio 150 at the spectral scanning controller 110.

At 510, a second value of the scanning frequency can be determined based on the second indication. Similar to the first value of the scanning frequency, the second value of the scanning frequency can be included in a second set of values of parameters that define a second spectral scanning configuration. Similar to the first spectral scanning configuration, the second set of values of parameters can include, for example, a value of the spectral scan duration, value(s) of a scanning pattern (e.g., a value of the sampling frequency and a value of the sampling window for producing spectral reports), and/or the like. In some embodiments, the second set of values of parameters including the second value of the scanning frequency can be determined based on the second indication and a value of the spectral scanning weight associated with a preference to allocate a specific proportion of a time period to spectral scanning via the WAP. The value of the spectral scanning weight can be different from the value of the spectral scanning weight associated with the first value of the scanning frequency, and the time period can be exclusive from the time period when the first value of the scanning frequency is implemented.

In the example of FIGS. 1-3, values of the parameters that define the spectral scanning configuration 300 can be determined at the spectral scanning controller 110. The values of the parameters can include, for example, a second value of the scanning frequency (i.e., reciprocal of the spectral scan period 310), the spectral scan duration 320, a value of the sampling frequency and a value of the sampling window associated with producing FFT reports 330, the service duration 340, etc. In some embodiments, the values of the parameters can be determined based on the second indication and other information received at the spectral scanning controller 110 such as, for example, a spectral scanning weight associated with a preference to allocate a specific proportion of a time period to spectral scanning via the WAP. The spectral scanning weight associated with the spectral scanning configuration 300 can be different from the spectral scanning weight associated with the spectral scanning configuration 200, and the time period when the spectral scanning configuration 300 is implemented can be exclusive from the time period when the spectral scanning configuration 200 is implemented.

At 512, a signal can be sent from the spectral scanning controller, where the signal is configured to cause the WAP to perform, at the second value of the scanning frequency, spectral scanning during a fourth time period after the third time period. The first value of the scanning frequency is different than the second value of the scanning frequency. In some embodiments, a second value of the scanning duration can be determined based on the second indication, where the second value of the scanning duration can be different than the first value of the scanning duration. The signal can be configured to cause the WAP to perform the spectral scanning at the second value of the scanning frequency for the second value of the scanning duration. In some embodiments, a second amount of spectral reports can be determined based on the second indication, where the second amount is different than the first amount. The signal can be configured to cause the WAP to perform the spectral scanning at the second value of the scanning frequency to produce the second amount of spectral reports.

In the example of FIGS. 1-3, the radio 150 can be configured to perform spectral scanning according to the spectral scanning configuration 300 for a fourth time period after the third time period. As shown in FIG. 3, the spectral scanning configuration 300 is defined based on at least the second value of the scanning frequency (i.e., reciprocal of the spectral scan period 310) that is different than the first value of the scanning frequency (i.e., reciprocal of the spectral scan period 210), the spectral scan duration 320 that is different than the spectral scan duration 220, a number associated with the FFT reports 330 (i.e., 1 FFT report 330 per spectral scan duration 320) that is different from the number associated with the FFT reports 230 (i.e., 5 FFT report 230 per spectral scan duration 220). As a result, the signal can be configured to cause the radio 150 to perform the spectral scanning at the second value of the scanning frequency for the spectral scan duration 320, and 1 FFT report 330 can be produced for each spectral scan duration.

While shown and described above with respect to FIG. 1 as the spectral scanning controller 110 and the spectral scanning module 152 being separate and performing different functionalities, in some other embodiments, the spectral scanning controller and the spectral scanning module of a radio can be integrated into one device. In such embodiments, the functionalities of the spectral scanning controller 110 and the spectral scanning module 152 as described herein can be performed by that integrated device. For example, the spectral scanning controller can be integrated into a radio, and function as a component of the radio.

While shown and described above with respect to FIGS. 2-4 as a sampling window occurring at the beginning of each spectral scan duration (e.g., the spectral scan duration 220, 320, or 420), in some other embodiments, the first sampling window included in a spectral scan duration does not start at the beginning of that spectral scan duration. In such embodiments, sampling signals from spectral scanning does not start immediately at the beginning of the spectral scan duration, but after a period of time during the spectral scan duration. At the end of or after each sampling window, a spectral report (e.g., a FFT report) can be produced based on the measurements recorded during the sampling window.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
   receive, at a spectral scanning controller, a first indication of at least one of a service demand or a service quality associated with a wireless access point (WAP) during a first time period;
   determine a first scanning frequency based on the first indication, the first scanning frequency corresponding to a reciprocal of a first spectral scan period;
   determine a first amount of spectral reports based on the first indication;
   send a signal configured to cause the WAP to perform, at the first scanning frequency, spectral scanning during a second time period after the first time period, the spectral scanning during the second time period producing the first amount of spectral reports;
   receive, at the spectral scanning controller, a second indication of at least one of a service demand or a service quality associated with the WAP during a third time period after the second time period;
   determine a second scanning frequency based on the second indication, the second scanning frequency corresponding to a reciprocal of a second spectral scan period;
   determine a second amount of spectral reports based on the second indication; and
   send a signal configured to cause the WAP to perform, at the second scanning frequency, spectral scanning during a fourth time period after the third time period, the first scanning frequency being different than the second scanning frequency, the spectral scanning during the fourth time period producing the second amount of spectral reports, the first amount of spectral reports being different than the second amount of spectral reports.

2. The non-transitory processor-readable medium of claim 1, further comprising code to cause the processor to:
   determine a first scanning duration based on the first indication, the code to cause the processor to send the signal configured to cause the WAP to perform spectral scanning at the first scanning frequency including code to cause the processor to send the signal configured to cause the WAP to perform spectral scanning at the first scanning frequency for the first scanning duration; and
   determine a second scanning duration based on the second indication, the code to cause the processor to send the signal configured to cause the WAP to perform spectral scanning at the second scanning frequency including code to cause the processor to send the signal configured to cause the WAP to perform spectral scanning at the second scanning frequency for the second scanning duration different than the first scanning duration.

3. The non-transitory processor-readable medium of claim 1, further comprising code to cause the processor to:
   receive, after the second time period, a signal associated with spectral scanning results; and
   send a set of spectral reports from the first amount of spectral reports to a spectrum monitor module such that the spectrum monitor module can change a channel of the WAP based on the set of spectral reports from the first amount of spectral reports.

4. The non-transitory processor-readable medium of claim 1, wherein the code to cause the processor to determine the first scanning frequency includes code to cause the processor to determine the first scanning frequency based on (1) the first indication and (2) a spectral scanning weight associated with a preference to allocate a specific proportion of the second time period to spectral scanning via the WAP.

5. The non-transitory processor-readable medium of claim 1, further comprising code to cause the processor to:
   receive, after the second time period, a signal associated with spectral scanning results; and
   send a set of spectral reports from the first amount of spectral reports to a spectrum monitor module such that the spectrum monitor module can classify an interference source using the set of spectral reports from the first amount of spectral reports.

6. An apparatus, comprising:
a memory,
a processing device, and
a spectral scanning controller including at least one of the memory or the processing device, the spectral scanning controller configured to receive a first indication of at least one of a service demand or a service quality associated with a wireless access point (WAP) during a first time period, the spectral scanning controller configured to determine a first scanning frequency based on the first indication, the first scanning frequency corresponding to a reciprocal of a first spectral scan period, the spectral scanning controller configured to determine a first amount of spectral reports based on the first indication, the spectral scanning controller configured to send a signal to cause the WAP to perform, at the first scanning frequency, spectral scanning during a second time period after the first time period to produce the first amount of spectral reports,
the spectral scanning controller configured to receive a second indication of at least one of a service demand or a service quality associated with the WAP during a third time period after the second time period, the spectral scanning controller configured to determine a second scanning frequency based on the second indication, the second scanning frequency corresponding to a reciprocal of a second spectral scan period, the spectral scanning controller configured to determine a second amount of spectral reports based on the second indication, the spectral scanning controller configured to send a signal to cause the WAP to perform, at the second scanning frequency, spectral scanning during a fourth time period after the third time period, the first scanning frequency being different than the second scanning frequency, the spectral scanning controller configured to perform the spectral scanning during the forth time period to produce the second amount of spectral reports, the first amount of spectral reports being different than the second amount of spectral reports.

7. The apparatus of claim 6, wherein the spectral scanning controller is configured to determine a first scanning duration based on the first indication, the spectral scanning controller configured to send the signal to cause the WAP to perform spectral scanning at the first scanning frequency for the first scanning duration,
the spectral scanning controller configured to determine a second scanning duration different than the first scanning duration and based on the second indication, the spectral scanning controller configured to send the signal to cause the WAP to perform spectral scanning at the second scanning frequency for the second scanning duration.

8. The apparatus of claim 6, wherein the spectral scanning controller is configured to receive, after the second time period, a signal associated with spectral scanning results, the spectral scanning controller configured to send a set of spectral reports from the first amount of spectral reports to a spectrum monitor module such that the spectrum monitor module can change a channel of the WAP based on the set of spectral reports from the first amount of spectral reports.

9. The apparatus of claim 6, wherein the spectral scanning controller is configured to determine the first scanning frequency based on (1) the first indication and (2) a spectral scanning weight associated with a preference to allocate a specific proportion of the second time period to spectral scanning via the WAP.

10. The apparatus of claim 6, wherein the spectral scanning controller is configured to receive, after the second time period, a signal associated with spectral scanning results,
the spectral scanning controller configured to send a set of spectral reports from the first amount of spectral reports to a spectrum monitor module such that the spectrum monitor module classifies an interference source using the set of spectral reports from the first amount of spectral reports.

11. A method, comprising:
receiving, at a spectral scanning controller, a first indication of at least one of a service demand or a service quality associated with a wireless access point (WAP) during a first time period;
determining a first scanning frequency based on the first indication, the first scanning frequency corresponding to a reciprocal of a first spectral scan period;
determine a first amount of spectral reports based on the first indication;
sending a signal configured to cause the WAP to perform, at the first scanning frequency, spectral scanning during a second time period after the first time period, the spectral scanning during the second time period producing the first amount of spectral reports;
receiving, at the spectral scanning controller, a second indication of at least one of a service demand or a service quality associated with the WAP during a third time period after the second time period;
determining a second scanning frequency based on the second indication, the second scanning frequency corresponding to a reciprocal of a second spectral scan period;
determine a second amount of spectral reports based on the second indication; and
sending a signal configured to cause the WAP to perform, at the second scanning frequency, spectral scanning during a fourth time period after the third time period, the first scanning frequency being different than the second scanning frequency, the spectral scanning during the fourth time period producing the second amount of spectral reports, the first amount of spectral reports being different than the second amount of spectral reports.

12. The method of claim 11, further comprising:
determining a first scanning duration based on the first indication, the sending the signal configured to cause the WAP to perform spectral scanning at the first scanning frequency includes sending the signal configured to cause the WAP to perform spectral scanning at the first scanning frequency for the first scanning duration; and
determining, based on the second indication, a second scanning duration different than the first scanning duration, the sending the signal configured to cause the WAP to perform spectral scanning at the second scanning frequency includes sending the signal configured to cause the WAP to perform spectral scanning at the second scanning frequency for the second scanning duration.

13. The method of claim 11, further comprising:
receiving, after the second time period, a signal associated with spectral scanning results; and
sending a set of spectral reports from the first amount of spectral reports to a spectrum monitor module such that the spectrum monitor module can change a channel of the WAP based on the set of spectral reports from the first amount of spectral reports.

14. The method of claim 11, wherein the determining the first scanning frequency includes determining the first scanning frequency based on (1) the first indication and (2) a spectral scanning weight associated with a preference to allocate a specific proportion of the second time period to spectral scanning via the WAP.

15. The method of claim 11, further comprising:
receiving, after the second time period, a signal associated with spectral scanning results; and
sending a set of spectral reports from the first amount of spectral reports to a spectrum monitor module such that the spectrum monitor module can classify an interference source using the set of spectral reports from the first amount of spectral reports.

* * * * *